United States Patent
Zhao et al.

(10) Patent No.: US 10,291,381 B2
(45) Date of Patent: May 14, 2019

(54) CO-TIME, CO-FREQUENCY FULL-DUPLEX TERMINAL AND SYSTEM

(71) Applicant: HUIZHOU TCL MOBILE COMMUNICATION CO., LTD, Huizhou, Guangdong (CN)

(72) Inventors: Shiqing Zhao, Huizhou (CN); Aiping George Guo, Huizhou (CN); Shenggang Hu, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 30 days.

(21) Appl. No.: 15/316,961

(22) PCT Filed: Apr. 7, 2016

(86) PCT No.: PCT/CN2016/078644
§ 371 (c)(1),
(2) Date: Dec. 7, 2016

(87) PCT Pub. No.: WO2017/008542
PCT Pub. Date: Jan. 19, 2017

(65) Prior Publication Data
US 2017/0279589 A1 Sep. 28, 2017

(30) Foreign Application Priority Data
Jul. 10, 2015 (CN) .......................... 2015 1 0402978

(51) Int. Cl.
*H04L 5/14* (2006.01)
*H04W 16/14* (2009.01)
(Continued)

(52) U.S. Cl.
CPC ................. *H04L 5/14* (2013.01); *H04B 1/10* (2013.01); *H04B 1/44* (2013.01); *H04B 1/525* (2013.01);
(Continued)

(58) Field of Classification Search
None
See application file for complete search history.

(56) References Cited

U.S. PATENT DOCUMENTS 4,406,016 A * 9/1983 Abrams ............ H04B 7/15585
455/19
2014/0342678 A1* 11/2014 Khlat ...................... H04L 5/001
455/78
(Continued)

FOREIGN PATENT DOCUMENTS

CN 103427872 A 12/2013
CN 103580720 A 2/2014
(Continued)

*Primary Examiner* — Faruk Hamza
*Assistant Examiner* — Cassandra L Decker
(74) *Attorney, Agent, or Firm* — Ladas & Parry LLP

(57) ABSTRACT

A co-time, co-frequency full-duplex terminal includes a radio frequency transceiver, a power divider, a local transmitting antenna, a controllable adaptive module, and a signal mixer. The radio frequency transceiver transmits a radio frequency signal. The power divider divides the radio frequency signal into radio frequency signals in a first path and a second path. The local transmitting antenna transmits the radio frequency signal in the first path. The controllable adaptive module controls the radio frequency signal in the second path to have an amplitude equal to an amplitude of a self-interfere signal and have a phase opposite to a phase of the self-interference signal. The signal mixer mixes the (Continued)

radio frequency signal, after being controlled by the controllable adaptive module, with a base station signal and the self-interference signal.

4 Claims, 3 Drawing Sheets

(51) Int. Cl.
    *H04B 1/54*     (2006.01)
    *H04B 1/10*     (2006.01)
    *H04B 1/44*     (2006.01)
    *H04B 1/7097*     (2011.01)
    *H04B 1/525*     (2015.01)

(52) U.S. Cl.
    CPC ............. *H04B 1/54* (2013.01); *H04B 1/7097* (2013.01); *H04W 16/14* (2013.01)

(56) References Cited

U.S. PATENT DOCUMENTS

| | | | |
|---|---|---|---|
| 2015/0078217 A1* | 3/2015 | Choi | H04L 5/14 370/278 |
| 2015/0249476 A1* | 9/2015 | Luo | H04B 1/123 375/350 |
| 2015/0311928 A1* | 10/2015 | Chen | H04B 1/525 375/350 |
| 2016/0087658 A1* | 3/2016 | Weissman | H04B 1/10 455/78 |
| 2017/0111155 A1* | 4/2017 | Liu | H04L 5/0055 |

FOREIGN PATENT DOCUMENTS

| | | |
|---|---|---|
| CN | 104506209 A | 4/2015 |
| CN | 104716980 A | 6/2015 |
| CN | 105119629 A | 12/2015 |

* cited by examiner

CO-TIME, CO-FREQUENCY FULL-DUPLEX TERMINAL AND SYSTEM

CROSS REFERENCE TO RELATED APPLICATIONS

This application claims the priority of International Application No. PCT/CN2016/078644, filed on Apr. 7, 2016, which claims priority to Chinese Application No. 201510402978.5, filed on Jul. 10, 2015 and entitled "CO-TIME CO-FREQUENCY FULL-DUPLEX TERMINAL AND SYSTEM". The entire disclosures of the above applications are incorporated herein by reference.

BACKGROUND

Field

The present disclosure relates to communication technology field, and more particularly to a co-time, co-frequency full-duplex terminal and system.

Background

With rapid growth of user rates and service requirements, bandwidth required by wireless communication systems is increasing, and demand for spectrum resources is increasing rapidly. However, wireless resources are limited, and expansion of wireless communication bands will bring challenges. Co-time, co-frequency full-duplex technology is a potential key technology for a next generation 5G, which refers to that transmitting and receiving are performed at a same time and at a same frequency.

In theory, transmission rate of the co-time co-frequency full-duplex technology can be doubled under same conditions when compared with conventional communications. However, a locally transmitted signal generates strong self-interference to a locally received signal. Accordingly, self-interference suppression is required in a radio frequency front end.

Consequently, the prior art is desired to be improved and enhanced.

SUMMARY OF THE DISCLOSURE

Based on the above-mentioned deficiencies in the prior art, an objective of the present invention is to provide a co-time, co-frequency full-duplex terminal and system capable of suppressing a self-interference signal to the greatest extent.

To achieve the above-mentioned objective, the present invention adopts the following schemes.

A co-time, co-frequency full-duplex terminal comprises:

A central processor, a radio frequency transceiver, a power divider, a power amplifier, a local transmitting antenna, a controllable adaptive module, a signal mixer, and a local receiving antenna, The central processor configured to control the radio frequency transceiver to transmit a radio frequency signal, wherein the radio frequency signal, which is transmitted by the radio frequency transceiver, is divided in two paths by the power divider, Among them, a radio frequency signal in one path is outwardly transmitted by the local transmitting antenna after being amplified by the power amplifier; the power amplifier is further configured to isolate a base station signal received by the local transmitting antenna; a radio frequency signal in the other path serves as a sampling signal and is amplified and a phase thereof is processed to be shifted by the controllable adaptive module, so that the sampling signal has an amplitude same as and a phase opposite to a self-interference signal received by the local receiving antenna, and transmitted to the signal mixer to be mixed with a base station signal and the self-interference signal which are received by the local receiving antenna, and then transmitted to the radio frequency transceiver, The controllable adaptive module comprises a controllable amplifier and a controllable phase shifter, Among them, the controllable amplifier amplifies the radio frequency in the other path, so that the amplified amplitude of the sampling signal is equal to that of the self-interference signal; the controllable phase shifter performs a phase shift process to the amplified sampling signal, so that the phase of the sampling signal is opposite to that of the self-interference signal which is received by the receiving antenna.

In the co-time, co-frequency full-duplex terminal, the central processor is configured to control an amplification factor of the controllable amplifier in real time.

In the co-time, co-frequency full-duplex terminal, the central processor is further configured to control a phase shifted by the controllable phase shifter in real time.

A co-time, co-frequency full-duplex terminal comprises:

A central processor, a radio frequency transceiver, a power divider, a power amplifier, a local transmitting antenna, a controllable adaptive module, a signal mixer, and a local receiving antenna, The central processor configured to control the radio frequency transceiver to transmit a radio frequency signal, wherein the radio frequency signal, which is transmitted by the radio frequency transceiver, is divided in two paths by the power divider, Among them, a radio frequency signal in one path is outwardly transmitted by the local transmitting antenna after being amplified by the power amplifier; a radio frequency signal in the other path serves as a sampling signal and is amplified and a phase thereof is processed to be shifted by the controllable adaptive module, so that the sampling signal has an amplitude equal to and a phase opposite to a self-interference signal received by the local receiving antenna, and transmitted to the signal mixer to be mixed with a base station signal and the self-interference signal which are received by the local receiving antenna, and then transmitted to the radio frequency transceiver.

In the co-time, co-frequency full-duplex terminal, the controllable adaptive module comprises a controllable amplifier and a controllable phase shifter, the controllable amplifier amplifies the radio frequency in the other path, so that the amplified amplitude of the sampling signal is equal to that of the self-interference signal; the controllable phase shifter performs a phase shift process to the amplified sampling signal, so that the phase of the sampling signal is opposite to that of the self-interference signal which is received by the receiving antenna.

In the co-time, co-frequency full-duplex terminal, the central processor is configured to control an amplification factor of the controllable amplifier in real time.

In the co-time, co-frequency full-duplex terminal, the central processor is further configured to control a phase shifted by the controllable phase shifter in real time.

In the co-time, co-frequency full-duplex terminal, the power amplifier is further configured to isolate a base station signal received by the local transmitting antenna.

A co-time, co-frequency full-duplex system comprises a base station and a co-time co-frequency full-duplex terminal, wherein the co-time co-frequency full-duplex comprises:

A central processor, a radio frequency transceiver, a power divider, a power amplifier, a local transmitting antenna, a controllable adaptive module, a signal mixer, and a local receiving antenna, The central processor configured to control the radio frequency transceiver to transmit a radio frequency signal, wherein radio frequency signal, which is transmitted by the radio frequency transceiver, is divided in two paths by the power divider, Among them, a radio frequency signal in one path is outwardly transmitted by the local transmitting antenna after being amplified by the power amplifier; a radio frequency signal in the other path serves as a sampling signal and is amplified and a phase thereof is processed to be shifted by the controllable adaptive module for amplifying and phase shift processes, so that the sampling signal has an amplitude equal to and a phase opposite to a self-interference signal received by the local receiving antenna, and transmitted to the signal mixer to be mixed with a base station signal and the self-interference signal which are received by the local receiving antenna, and then transmitted to the radio frequency transceiver.

In the co-time, co-frequency full-duplex system, the controllable adaptive module comprises a controllable amplifier and a controllable phase shifter, wherein the controllable amplifier amplifies the amplified radio frequency in the other path, so that the amplitude of the sampling signal is equal to that of the self-interference signal; the controllable phase shifter performs a phase shift process to the amplified sampling signal, so that the phase of the sampling signal is opposite to that of the self-interference signal which is received by the receiving antenna.

In the co-time, co-frequency full-duplex system, the central processor is configured to control an amplification factor of the controllable amplifier in real time.

In the co-time, co-frequency full-duplex system, the central processor is further configured to control a phase shifted by the controllable phase shifter in real time.

In the co-time, co-frequency full-duplex system, the power amplifier is further configured to isolate a base station signal received by the local transmitting antenna.

Compared to the prior art, the co-time, co-frequency full-duplex terminal and system provided by the present invention utilize the central processor to control the radio frequency transceiver to transmit a radio frequency signal. The radio frequency signal is divided in two paths by the power divider. A radio frequency signal in one path is outwardly transmitted by the local transmitting antenna after being amplified by the power amplifier. A radio frequency signal in the other path serves as a sampling signal and is transmitted to the controllable adaptive module for amplifying and phase shift processes, so that the sampling signal and the self-interference signal of the local receiving antenna have the same amplitude and opposite phases. The sampling signal is transmitted to the radio frequency transceiver after being mixed with the base station signal received by the local receiving antenna. As such, controlling the amplitude and the phase of the sampling signal in real time can be implemented, so that the self-interference signal can be suppressed to the greatest extent, and the performance of the self-interference suppression can be enhanced.

DETAILED DESCRIPTION OF THE PREFERRED EMBODIMENTS

To make the objectives, technical schemes, and technical effects of the present invention more clear and definite, the present invention will be described in details below by using embodiments in conjunction with the appending drawings. It should be understood that the specific embodiments described herein are merely for explaining the present invention and are not intended to limit the present invention.

Figure 1:
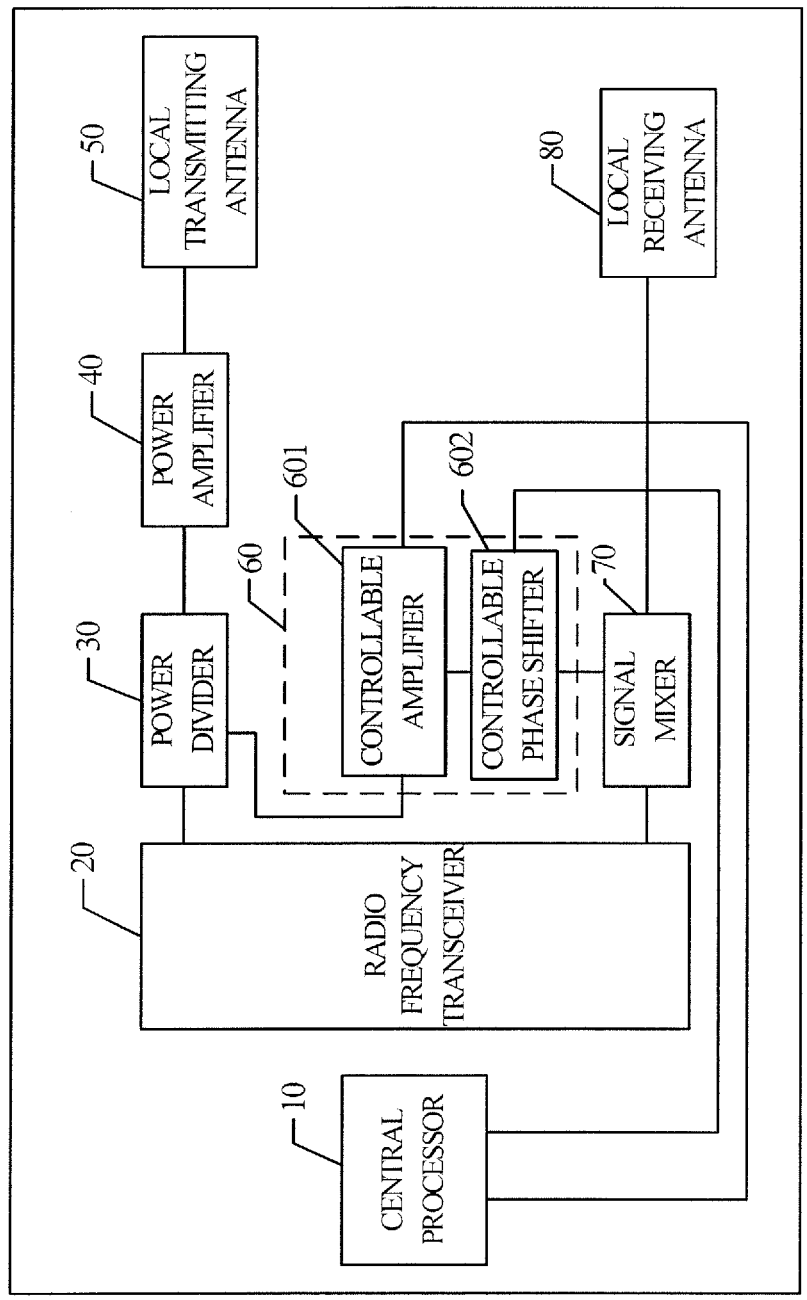
FIG. 1 is a structural block diagram of a co-time, co-frequency full-duplex terminal in accordance with the present invention.

Please refer to FIG. 1. A co-time, co-frequency full-duplex terminal provided by the present invention includes a central processor 10, a radio frequency transceiver 20, a power divider 30, a power amplifier 40, a local transmitting antenna 50, a controllable adaptive module 60, a signal mixer 70, and a local receiving antenna 80. The central processor 10 is connected to the radio frequency transceiver and the controllable adaptive module 60. A TX (i.e., transmit) port is connected to the power divider 30. An output terminal of the power divider 30 is connected to the local transmitting antenna 50 via the power amplifier 40. The other output terminal of the power divider 30 is connected to the local receiving antenna 80 via the controllable adaptive module 60.

Among them, the central processor 10 is configured to control the radio frequency transceiver 20 to transmit a radio frequency signal and receive an external radio frequency signal. The radio frequency transceiver 20 outputs the radio frequency signal via the TX port and receives the radio frequency signal via an RX (i.e., receive) port. Among them, the radio frequency signal, outputted by the radio frequency transceiver 20, is divided in two paths by the power divider 30. A radio frequency signal in one path is outwardly transmitted by the local transmitting antenna 50 after being amplified by the power amplifier 40. A radio frequency signal in the other path serves as a sampling signal and is transmitted to the controllable adaptive module 60 for amplifying and phase shift processes.

In the embodiment of the present invention, the sampling signal, configured to suppress a self-interference signal, comes from the radio frequency signal which is outputted from the TX port of the radio frequency transceiver 20, thereby ensuring that the sampling signal is clean and performance of self-interference suppression is enhanced.

Please continue to refer to FIG. 1. The sampling signal which is divided by the power divider 30 is required to be treated with the amplifying and phase shift processes by the controllable adaptive module 60. Among them, the controllable adaptive module 60 includes a controllable amplifier 601 and a controllable phase shifter 602. The controllable amplifier 601 is configured to amplify an amplitude of the sampling signal. The controllable phase shifter 602 is configured to adjust a phase of the sampling signal.

Specifically, the controllable amplifier 601 amplifies the sampling signal, so that an amplitude of the amplified sampling signal is equal to an amplitude of a self-interference signal (i.e., a signal which is outputted by the local transmitting antenna 50 and received by the local receiving antenna 80). The controllable phase shifter 602 performs the phase shift process to the amplified sampling signal, so that the phase of the sampling is opposite to a phase of the self-interference signal. As such, the self-interference signal can be suppressed to the greatest extent, and an objective of a co-time co-frequency full-duplex communication can be achieved.

Please continue to refer to FIG. 1. The sampling signal is transmitted to the signal mixer 70 to be mixed with the self-interference signal and a base station signal which are received by the local receiving antenna 80, after the controllable adaptive module 60 performs the amplifying and the phase shift processes to the sampling signal. As such, the self-interference signal offsets the adjusted sampling signal completely, and a result signal is transmitted to the radio frequency transceiver 20.

Since the signal outputted by the radio frequency transceiver 20 and the self-interference signal received by the local receiving antenna 80 are not invariable, it is required to perform a real-time control to the sampling signal for suppressing the self-interference signal. In the present invention, the central processor 10 may be further configured to, in real time, control an amplification factor of the controllable amplifier 601 and control a phase which is shifted by the controllable phase shifter 602 according to the amplification factor of the power amplifier 40 and the phase of the radio frequency signal outputted by the TX port. As such, adjusting the sampling signal in real time can be implemented, so that the sampling signal always has the same amplitude as and the opposite phase to the self-interference signal, and the performance of the self-interference suppression can be further enhanced.

Please continue to refer to FIG. 1. The power amplifier 40 is further configured to isolate a base station signal received by the local transmitting antenna 50, thereby ensuring that the sampling signal is not polluted by an external noise signal and purity of the sampling signal can be increased. To improve performance of the co-time, co-frequency full-duplex, isolation between the local transmitting antenna 50 and the local receiving antenna 80 should be as large as possible.

Figure 2:
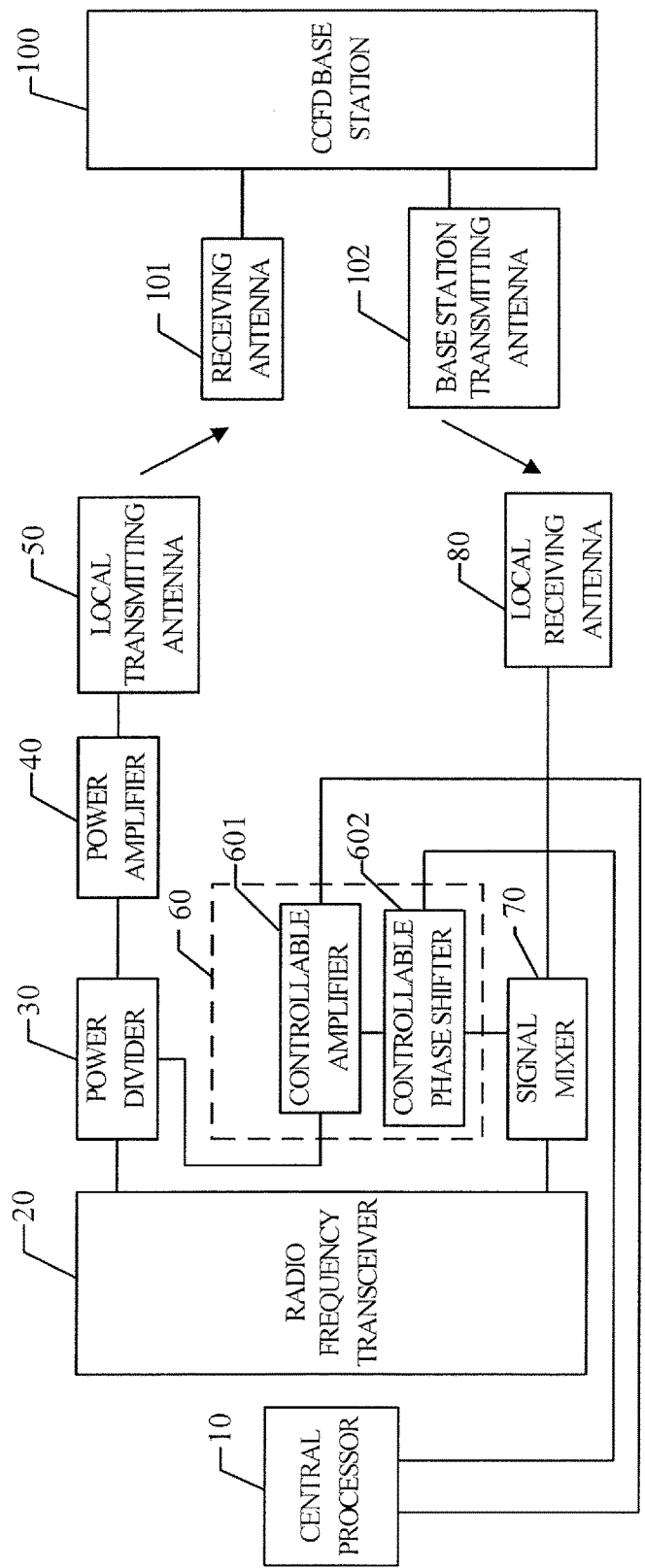
FIG. 2 is a structural block diagram of a co-time, co-frequency full-duplex system in accordance with the present invention.

Please refer to FIG. 2. The present invention further correspondingly provides a co-time, co-frequency full-duplex system which includes a base station and the above-mentioned co-time, co-frequency full-duplex terminal. The base station is a co-time, co-frequency full-duplex (CCFD) base station 100 which includes a receiving antenna 101 and a base station transmitting antenna 102. Since the co-time, co-frequency full-duplex terminal is described in detail as above and the CCFD base station 100 is prior art, detailed descriptions are omitted herein.

An operational process of the co-time, co-frequency full-duplex system of the present invention is described in detail as follows.

Figure 3:
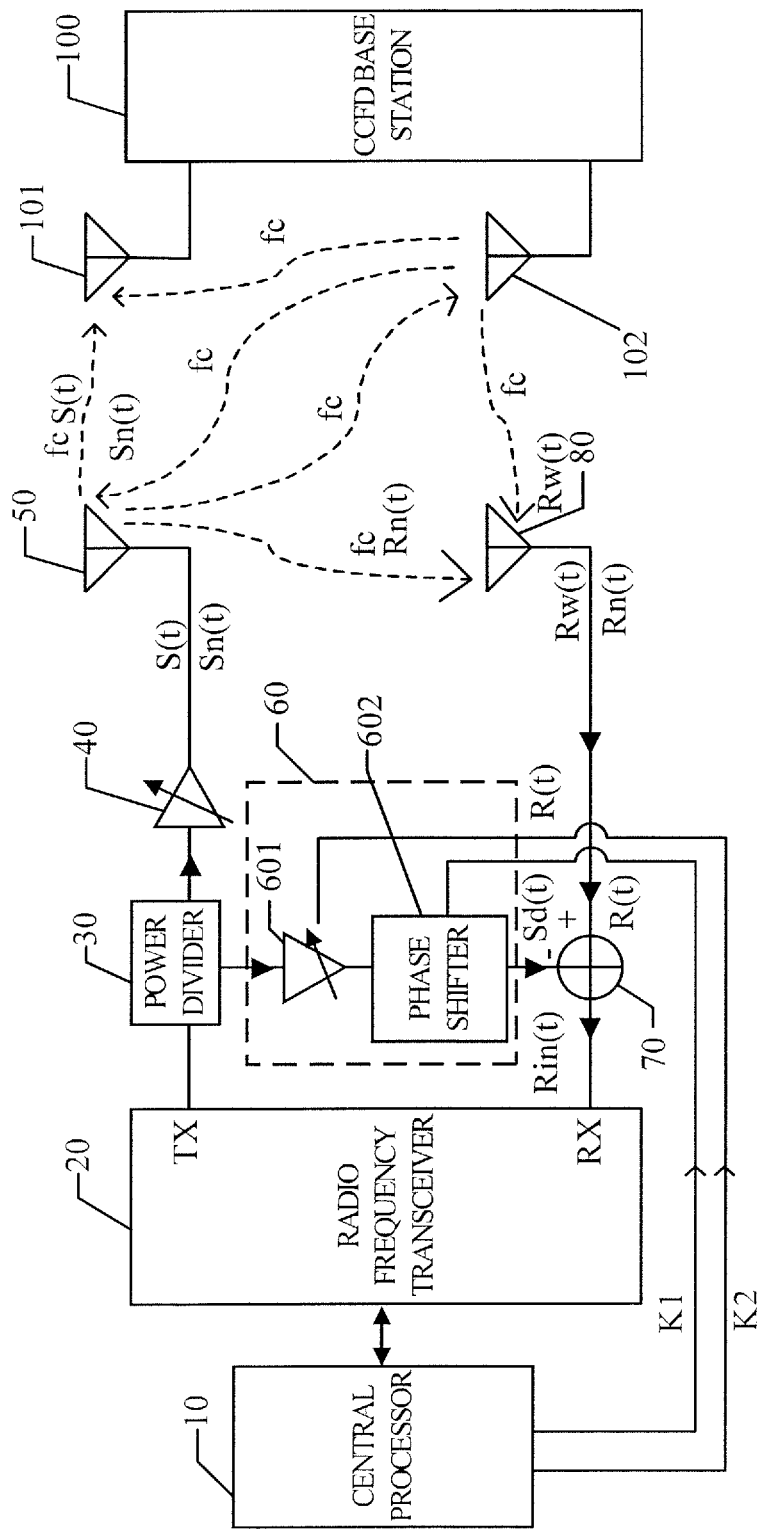
FIG. 3 is a principle diagram of the co-time, co-frequency full-duplex system in accordance with the present invention.

As shown in FIG. 3, the radio frequency transceiver 20 outputs a radio frequency signal via the TX port thereof and receives a radio frequency signal via the RX port. The radio frequency signal which is outputted via the TX port of the radio frequency transceiver 20 is divided in two paths of signals by the power divider 30. A radio frequency signal in one path is outputted to the power amplifier 40 and then outwardly transmitted by the local transmitting antenna 50. A radio frequency signal in the other path serves as a sampling signal, is treated with the amplifying and the phase shift processes by the controllable adaptive module 60, is transmitted to the signal mixer 70 to be mixed with a based signal and a self-interference signal which are received by the local receiving antenna 80, and is transmitted to the radio frequency transceiver 20.

In a specific application, the local transmitting antenna 50 mainly has two signals. One is a local transmitting signal S(t), and the other is a base station Sn(t) which is received by the local transmitting antenna 50. The local transmitting signal S(t) is transmitted outwardly by the local transmitting antenna 50. The base station signal Sn(t) cannot enter the power divider 30 due to an isolation function of the power amplifier 40, that is, cannot be mixed with the sampling signal, thereby ensuring that the sampling signal is not polluted by the external noise signal.

The local receiving antenna 80 receives two signals. One is a transmitting signal from the base station Rw(t), and the other is a local transmitting signal. That is, a total receiving signal R(t) of the local receiving antenna 80 is:

$$R(t)=Rw(t)+Rn(t)$$

In order to eliminate the local transmitting signal Rn(t) (i.e., the self-interference signal) which is received by the local receiving antenna 80, the central processor 10 controls the controllable amplifier 601 to amplify the sampling signal in real time, so that an amplitude of the amplified sampling signal is equal to an amplitude of the self-interference signal. The central processor 10 also controls the controllable phase shifter 602 to perform a phase shift process to the amplified sampling signal, so that a phase of the sampling signal Sd(t) which is phase shifted is opposite to a phase of the self-interference signal Rn(t):

$$Sd(t)=-Rn(t)$$

The processed sampling signal Sd(t) is mixed, in the signal mixer 70, with the self-interference signal Rn(t) which is received by the local receiving antenna 80. A mixed result is:

$$Sd(t)+Rn(t)=0$$

An output signal Rin (t) after the total receiving signal R(t) is mixed with the processed sampling signal Sd(t) in the signal mixer is:

$$\begin{aligned}Rin(t) &= R(t) + Sd(t) \\ &= [Rw(t) + Rn(t)] + [-Rn(t)] \\ &= Rw(t)\end{aligned}$$

That is, after the signal received by the local receiving antenna 80 is mixed with the processed sampling signal, the self-interference signal is totally eliminated in theory. The radio frequency signal outputted to the radio frequency transceiver 20 is the signal Rw(t) which is received from the base station 100 by the local receiving antenna 80. That is, Rin(t)=Rw(t). The output signal Rin(t) is received by the RX port of the radio frequency transceiver 20, and then transmitted to the central processor 10 for processing after being demodulated. As such, controlling the amplitude and the phase of the sampling signal in real time can be implemented, so that the self-interference signal can be suppressed to the greatest extent, and the objective of the co-time co-frequency full-duplex communication can be achieved.

In summary, the co-time co-frequency full-duplex terminal and system provided by the present invention utilize the central processor to control the radio frequency transceiver to transmit a radio frequency signal. The radio frequency signal is divided in two paths by the power divider. A radio frequency signal in one path is outwardly transmitted by the local transmitting antenna after being amplified by the power amplifier. A radio frequency signal in the other path serves as a sampling signal and is transmitted to the controllable adaptive module for amplifying and phase shift processes, so that the sampling signal and the self-interference signal of the local receiving antenna have the same amplitude and opposite phases. The sampling signal is transmitted to the radio frequency transceiver after being mixed with the base station signal received by the local receiving antenna. As such, controlling the amplitude and the phase of the sampling signal in real time can be implemented, so that the self-interference signal can be suppressed to the greatest extent, and the performance of the self-interference suppression can be enhanced.

The above description is merely the specific embodiments of the present disclosure, but the protection scope of the present disclosure is not limited thereto, any skilled who is familiar with this art could readily conceive variations or substitutions within the disclosed technical scope disclosed by the present disclosure, and these variations or substitutions shall be encompassed in the protection scope of the present disclosure. Thus, the protection scope of the present disclosure shall be subjected to the protection scope of the claims.

What is claimed is:

1. A co-time, co-frequency full-duplex terminal, comprising:
    a radio frequency transceiver configured to transmit a radio frequency signal;
    a power divider configured to divide the radio frequency signal into a first radio frequency signal in a first path and a second radio frequency signal in a second path;
    a local transmitting antenna configured to transmit the first radio frequency signal in the first path;
    a power amplifier configured to amplify the first radio frequency signal in the first path and transmit the amplified first radio frequency signal to the local transmitting antenna;
    a controllable adaptive module configured to control the second radio frequency signal in the second path to have an amplitude equal to an amplitude of a self-interference signal and have a phase opposite to a phase of the self-interference signal, wherein the self-interference signal is generated by the radio frequency transceiver;
    a signal mixer configured to mix the second radio frequency signal in the second path, after being controlled by the controllable adaptive module, with a base station signal and the self-interference signal received via a local receiving antenna; and
    a central processor connected to the controllable adaptive module,
    wherein the controllable adaptive module comprises:
    a controllable amplifier configured to amplify, in real time, the amplitude of the second radio frequency signal in the second path to be equal to the amplitude of the self-interference signal; and
    a controllable phase shifter configured to shift, in real time, the phase of the second radio frequency signal in the second path to be opposite to the phase of the self-interference signal,
    the central processor is configured to, in real time, control an amplification factor of the controllable amplifier and control the phase of the second radio frequency signal which is shifted by the controllable phase shifter according to an amplification factor of the power amplifier and a phase of the radio frequency signal outputted by the radio frequency transceiver.

2. The co-time, co-frequency full-duplex terminal of claim 1, wherein the power amplifier is further configured to isolate the base station signal received by the local transmitting antenna.

3. A co-time, co-frequency full-duplex system, comprising:
    a base station; and
    a co-time co-frequency full-duplex terminal configured to receive a base station signal from the base station, wherein the co-time co-frequency full-duplex comprises:
    a radio frequency transceiver configured to transmit a radio frequency signal;
    a power divider configured to divide the radio frequency signal into a first radio frequency signal in a first path and a second radio frequency signal in a second path;
    a local transmitting antenna configured to transmit the first radio frequency signal in the first path;
    a power amplifier configured to amplify the first radio frequency signal in the first path and transmit the amplified first radio frequency signal to the local transmitting antenna;
    a controllable adaptive module configured to control the second radio frequency signal in the second path to have an amplitude equal to an amplitude of a self-interference signal and have a phase opposite to a phase of the self-interference signal, wherein the self-interference signal is generated by the radio frequency transceiver;
    a signal mixer configured to mix the second radio frequency signal in the second path, after being controlled by the controllable adaptive module, with the base station signal and the self-interference signal received via a local receiving antenna; and
    a central processor connected to the controllable adaptive module,
    wherein the controllable adaptive module comprises:
    a controllable amplifier configured to amplify, in real time, the amplitude of the second radio frequency signal in the second path to be equal to the amplitude of the self-interference signal; and
    a controllable phase shifter configured to shift, in real time, the phase of the second radio frequency signal in the second path to be opposite to the phase of the self-interference signal,
    the central processor is configured to, in real time, control an amplification factor of the controllable amplifier and control the phase of the second radio frequency signal which is shifted by the controllable phase shifter according to an amplification factor of the power amplifier and a phase of the radio frequency signal outputted by the radio frequency transceiver.

4. The co-time, co-frequency full-duplex system of claim 3, wherein the power amplifier is further configured to isolate the base station signal received by the local transmitting antenna.

* * * * *